(12) United States Patent  
Oesterling (10) Patent No.: US 8,731,145 B2
(45) Date of Patent: May 20, 2014

(54) METHOD OF VEHICLE NOTIFICATION OF CALL CENTER SERVICE INTERRUPTIONS

(75) Inventor: Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 1126 days.

(21) Appl. No.: 11/963,162

(22) Filed: Dec. 21, 2007

(65) Prior Publication Data

US 2009/0161836 A1   Jun. 25, 2009

(51) Int. Cl.
*H04M 11/04* (2006.01)
*H04M 7/00* (2006.01)
*H04W 36/00* (2009.01)
*H04W 68/00* (2009.01)
*G01C 5/00* (2006.01)
*G01M 17/00* (2006.01)

(52) U.S. Cl.
USPC ..... 379/48; 379/221.03; 455/436; 455/569.2; 701/31.4; 701/31.5

(58) Field of Classification Search
USPC ........ 379/221.03, 48, 37, 51, 88.12; 455/425, 455/411, 404.2, 569.2, 575.9, 90.1, 12.1, 455/569.1, 466, 436; 701/9, 31.4, 31.5
See application file for complete search history.

(56) References Cited

U.S. PATENT DOCUMENTS

| | | | | |
|---|---|---|---|---|
| 5,890,061 | A * | 3/1999 | Timm et al. | 455/404.2 |
| 2004/0203728 | A1* | 10/2004 | Schwinke et al. | 455/425 |
| 2006/0079203 | A1* | 4/2006 | Nicolini | 455/411 |
| 2010/0035543 | A1* | 2/2010 | Nishida | 455/12.1 |

\* cited by examiner

*Primary Examiner* — Thjuan K Addy
(74) *Attorney, Agent, or Firm* — Anthony Luke Simon; Reising Ethington P.C.

(57) ABSTRACT

A method of regulating data transmissions used with telematics-equipped vehicles. The steps include establishing a period of anticipated call center service outage, notifying a plurality of telematics units of the period of anticipated call center service outage, storing that outage information at the plurality of telematics units, and then when a call from the vehicle to the call center is desired during the service outage, the process implements a call handling procedure that delays most calls until the call center is available, but that provides alternative call solutions for urgent or occupant-placed calls. Once the call center is available, postponed calls can be staggered to avoid a large initial spike in calls received at the call center.

19 Claims, 4 Drawing Sheets

METHOD OF VEHICLE NOTIFICATION OF CALL CENTER SERVICE INTERRUPTIONS

TECHNICAL FIELD

The present invention relates generally to a method for handling vehicle calls to a call center and, more particularly, to a communications method for handling calls from a vehicle to a call center during periods of service outage or unavailability of the call center.

BACKGROUND

Modern vehicles acquire and use large quantities of data. Vehicles wirelessly transmit and receive significant amounts of this data via a telematics unit through wireless telephony. After sending data from a vehicle, a call center usually stands by to receive the transmission. This arrangement works well so long as vehicles and call centers operate normally. But sometimes call centers cannot provide service for a variety of reasons. For example, the call center may be taken offline for maintenance reasons or due to communication system outages because of weather or other reasons. Therefore, when call centers are unable or unwilling to answer the data sent from vehicles, the vehicles may repeatedly attempt to connect with the call center in order to ensure their data is transmitted. As time passes, the number of vehicles attempting to contact the unavailable call center would steadily increase as would the overall volume of queries sent to it. The increased volume would place an increased demand on the communications infrastructure, potentially impacting its operation.

SUMMARY OF THE INVENTION

According to an aspect of the invention, there is provided a method of handling calls from telematics-equipped vehicles during call center outages. The method includes the steps of (a) receiving a notification at a vehicle telematics unit of a call center service outage, (b) detecting that a call from the vehicle to the call center is desired during the call center service outage, and (c) carrying out a call handling procedure for the desired call at the vehicle.

According to another aspect of the invention, there is provided a method of handling data transmissions from telematics-equipped vehicles during periods of call center unavailability. The method includes the steps of (a) identifying time periods during which a call center will be unavailable, (b) wirelessly conveying to a plurality of telematics-equipped vehicles the periods during which a call center will be unavailable, and (c) delaying communication attempts from the telematics-equipped vehicles to the call center based on the periods during which a call center will be unavailable.

According to another aspect of the invention, there is provided a method of handling data transmissions from telematics-equipped vehicles during call center outages. The method includes the steps of (a) establishing at least one period of anticipated call center service outage, (b) notifying a plurality of telematics units of the at least one period of anticipated call center service outage, (c) storing the at least one period of anticipated call center service outage at the plurality of telematics units, (d) checking whether a desired communication to a call center occurs during the at least one period of anticipated call center service outage, and (e) postponing contacting the call center if the desired communication is during the at least one period of anticipated service outage.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method of handling voice calls and data transmissions sent from telematics-equipped vehicles described below generally attempts to prevent a large number of vehicles from contacting inactive or unavailable call centers by anticipating the influx of calls and informing the vehicles that a particular call center is unavailable. This information is then used to carry out a call handling procedure that in most cases delays vehicles' regularly scheduled calls until after the call center unavailability has passed. Doing so helps to reduce needless call attempts by the vehicle to the call center that could otherwise hinder wireless carrier systems.

Communications System—

Figure 1:
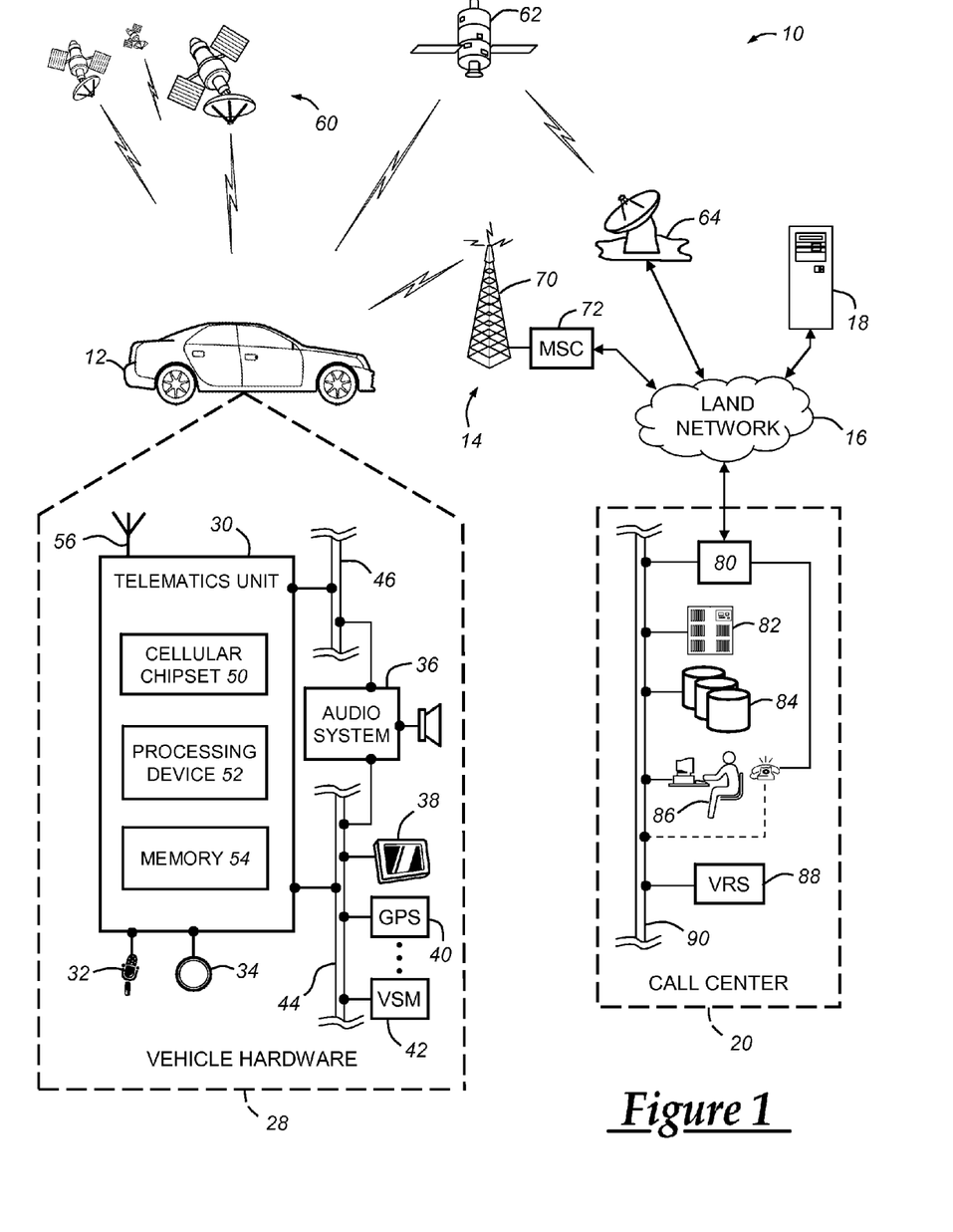
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, and WiMAX.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Call Handling Method—

As mentioned previously, the disclosed method of handling communications sent from a large number of telematics-equipped vehicles attempts to identify time periods during which a call center will be unavailable, wirelessly convey that information to the telematics-equipped vehicles, and then delay most communication attempts from the vehicles that occur during the periods of call center unavailability. Doing so minimizes the effect a large number of telematics-equipped vehicles calling unavailable or inactive call centers which would have on wireless carrier systems and call centers themselves. In the past, a call center could either go offline to be serviced for a period of time, or be rendered inoperable or become unavailable by unforeseen circumstances. During this time, a continuously increasing number of telematics-equipped vehicles would continue to contact the call center. Additionally, when a telematics-equipped vehicle was unable to connect with a call center during one of these outages, the telematics-equipped vehicle would at least sometimes implement a retry strategy that increased the frequency of contact attempts, compounding the problem. Multiplying this situation over a great number of vehicles, wireless carrier systems and call centers could become overwhelmed very quickly. Consequently, the disclosed approach of informing telematics-equipped vehicles of present or impending call center outages was developed to prevent an overwhelming influx of wireless traffic.

Figure 2:
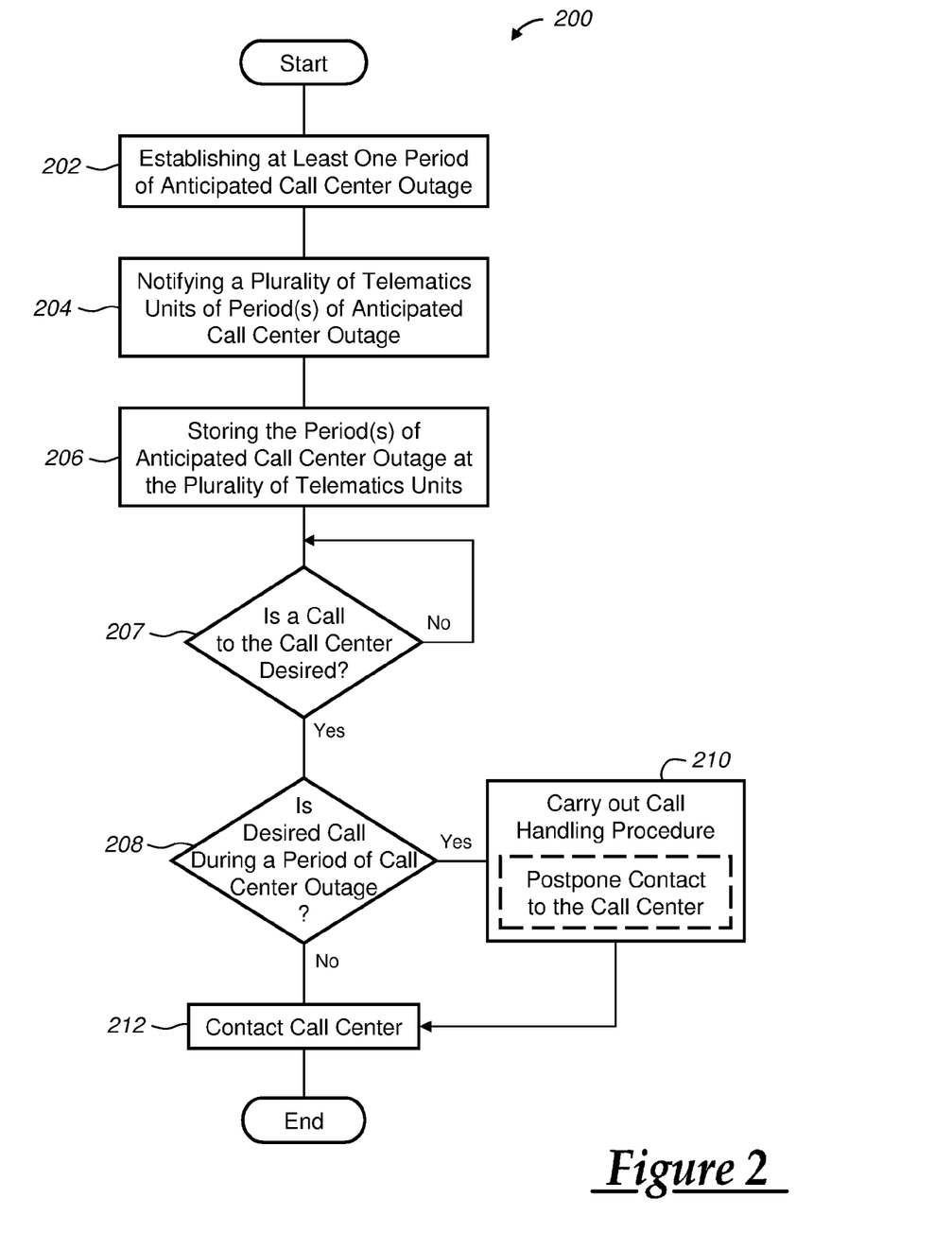
FIG. 2 is a flow chart depicting steps of an embodiment for handling calls during call center service outages or unavailability.

Turning now to FIG. 2, there is shown some of the steps of an embodiment 200 of the present transmission regulation method. This exemplary embodiment 200 is provided to illustrate some of the aspects and features of the transmission regulation method, and is directed to an embodiment where a central facility, such as a call center 20, establishes a time period or multiple time periods during which the call center 20 or multiple call centers 20 will be unavailable or offline. The call center 20 then sends the time period to many vehicles 12 that, in turn, store the time period. When a vehicle 12 anticipates contacting a call center 20, the vehicle 12 can then compare the stored time period or periods with the time at which the vehicle 12 is contacting the call center 20. If the time at which the vehicle 12 anticipates contacting the call center 20 occurs during a stored time period, the vehicle 12 can then delay contacting the call center 20 until a time that no longer conflicts with the time period. It can also be appreciated that this method readily lends itself to use with a plurality of call centers.

Beginning with step 202, the method establishes at least one period of anticipated call center service outage. For example, a service outage can be generally described as a condition where the call center 20 is unable or unwilling to receive transmissions from a telematics unit 30. Service outages can occur at one call center 20, selected call centers 20, or all call centers 20. Additionally, service outages can be planned or unplanned. Examples of planned service outages include service downtime due to scheduled maintenance on the call center 20 or scheduled downtime because of low traffic during specific hours of the day. Planned call center service outages can also include situations where the call center 20 experiences an outage every week for maintenance. For instance, if the call center 20 needed weekly updating and each update required an hour of service interruption, the update could be scheduled for a periodic time (e.g. Sunday between 1-2 AM). Conversely, unplanned service outages can include unexpected problems with the wireless carrier system 14 or as the result of natural disasters such as hurricanes, earthquakes, or any type of force majeure that renders a call center 20 unavailable or inoperable. Additionally, the period of anticipated call center service outage can also vary. While the example above illustrates a call center service outage as an hour, an outage could be any period of time, such as an hour, several hours, a day, or could even be described as continuing until further notice. After at least one period of anticipated call center service outage is established, the method then proceeds to step 204.

At step 204, the method notifies a plurality of telematics units of at least one period of anticipated call center service outage. In this example, the plurality of telematics units is a group of thousands of vehicles 12, although it will be appreciated that the method can be used with a wide range in number of vehicles from only a couple of vehicles to millions of vehicles in some cases, each equipped with a telematics unit 30. Also, the method can be used with only a subset of the available telematics-equipped vehicles out on the road; for example, it could be used in conjunction with a specific fleet of vehicles. The vehicles 12 can be notified wirelessly in a variety of ways. In one example, the telematics unit 30 has diagnostic capabilities and communicates with a call center 20 via a vehicle data upload (VDU). A vehicle data upload is often the result of vehicle triggers emanating from the vehicle's diagnostic system, or can be from other conditions such as a predetermined number of ignition attempts or the passage of a certain amount of time. When a telematics unit 30 senses a vehicle trigger, the unit 30 contacts the call center 20 to exchange data. This data can be any desired vehicle data such as, for example, any of the data that would be sent in conjunction with the various vehicle services specified above that are available via the telematics unit 30. Through the data upload, a call center 20 can also send the telematics unit 30 data indicating at least one period of anticipated call center service outage. This data can contain dates, times, both dates and times, or ranges of times. Additionally, the call center 20 can initiate the VDU and send notice of planned or unplanned call center service outages to the telematics unit 30. In another example, the telematics unit 30 can receive the anticipated call center service outages via infotainment service providers, such as via a satellite radio broadcast. Techniques for sending information to a vehicle via satellite radio transmission are known to those skilled in the art. See, for example, U.S. patent application Ser. No. 11/610,926 assigned to the assignee of this application. Once the plurality of telematics units are notified, the method proceeds to step 206.

At step 206, the method stores at least one period of anticipated call center service outage at the plurality of telematics units. Notifications of outages can be stored in various locations, such as the memory devices 54 in the telematics unit 30 or within the vehicle electronics 28. Using the notifications, vehicles 12 can determine which call centers 20 presently have or in the future will have service outages and the time periods during which they will have the outages. It should be appreciated that the call center service outage notifications can be stored at the vehicle 12 using a variety of known data storage methods. After storing the call center service outages at step 206, the method progresses to step 207.

Step 207 is essentially a waiting step or break in the method in which nothing further need occur until the system detects that a call to the call center is desired. This may be as the result of a trigger, as discussed above, or possibly because the vehicle driver or other occupant has manually attempted to initiate a call to the call center via button 34 or via the on-board speech processing unit using microphone 32.

Once a call to the call center is desired, then at step 208, the method checks whether the desired call is occurring during a period of anticipated call center service outage. The telematics unit 30 can determine the time at which it is contacting the call center 20. This time can be generated using an internal clock located in the telematics unit 30, time data provided by the wireless carrier system 14 or by a GPS signal, or via other implementations known in the art. After determining the time at which telematics unit 30 is contacting the call center 20, it can then compare that time with the stored periods of anticipated call center service outage. If the time at which the telematics unit 30 desires to contact the call center 20 occurs during a period of call center service outage, the method progresses to step 210 to implement a call handling procedure. In this embodiment, the call handling procedure postpones the call until the call center becomes available. In other embodiments, such as will be described in conjunction with FIG. 3, the call handling procedure processes the desired call according to some attribute of the call, such as the purpose of the call, its priority, or based on how the call was initiated (e.g., automatically by the vehicle versus manually by the driver or other occupant). This step 210 helps prevent the telematics unit 30 from needlessly and frequently contacting the call center 20 when it is unavailable. Alternatively, if at step 208 the telematics unit 30 determines that the time at which it is contacting the call center 20 does not interfere with a call center service outage, the telematics unit 30 can proceed to contact the call center 20, as indicated at step 212.

Where postponement of the call is needed at step 210, any of a number of approaches for proceeding can be utilized. For instance, the telematics unit 30 can access the stored period of anticipated call center service outage and determine the time at which the period is expected to expire. At that time the telematics unit 30 can delay contacting the call center until the period has expired and then call or contact the call center 20 as planned. Alternatively, the telematics unit 30 could postpone contacting the call center 20, but periodically contact the call center 20 (e.g. every hour) to check if the call center service outage has passed. Periodically checking the call center 20, as described here, is unlike the situation where the telematics unit 30 has normally been unable to contact the call center 20 and therefore initiates frequent retries. In this example, the period between contact attempts would be set to be much less frequent. Once it is determined that the call center is again available and the call should be placed, the method proceeds to step 212 where the call is placed and the process ends.

Figure 3:
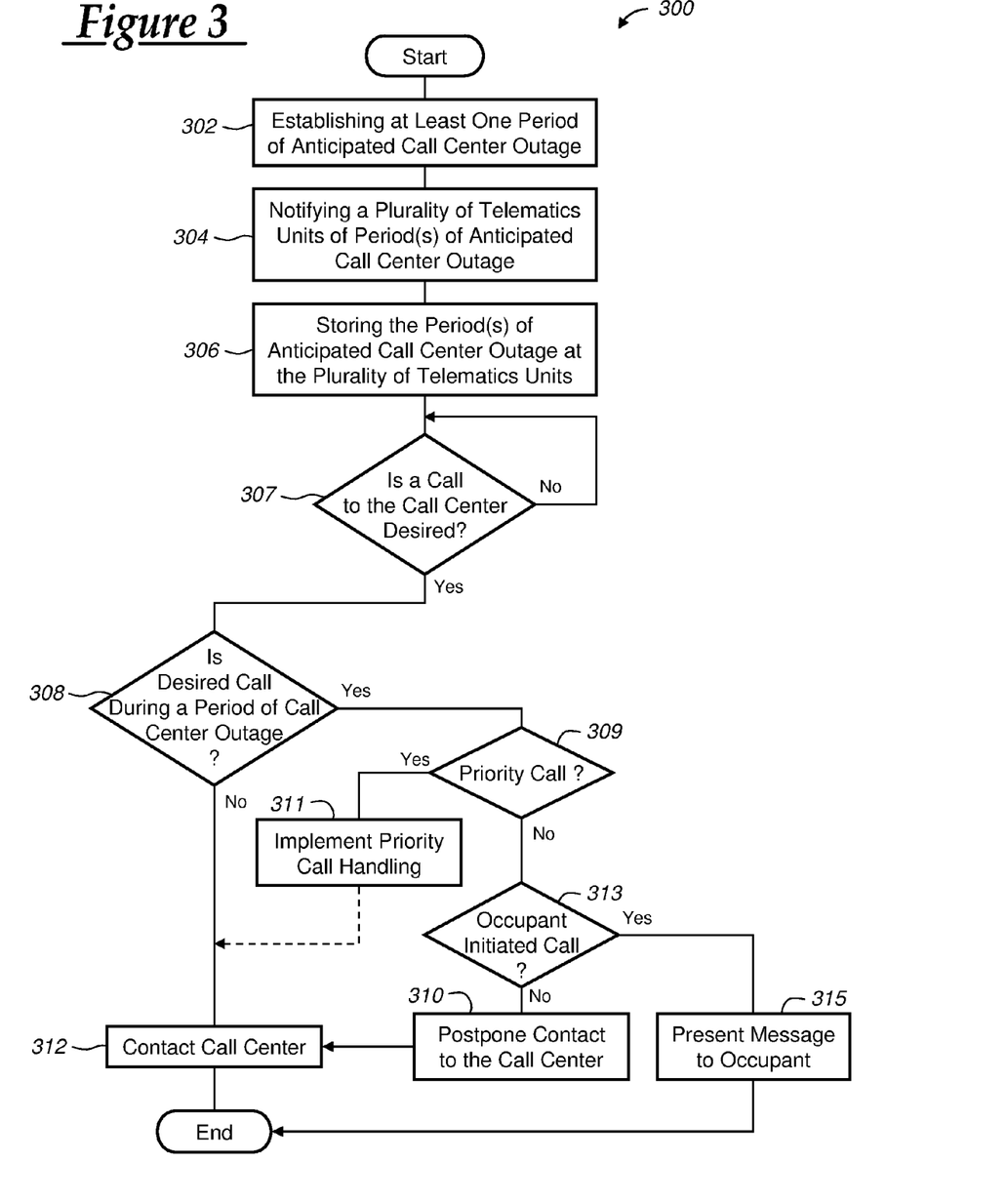
FIG. 3 is a flow chart of an alternative embodiment of a call handling method.

FIG. 3 depicts a modified version 300 of the method of FIG. 2 in which provision is made for handling attempted calls initiated by the vehicle driver or other occupant and where the call is of a higher priority or more urgent nature. The steps 302-308, 310, and 312 can be the same as the corresponding steps of FIG. 2. Once it is determined that a call to the call center is desired and it is during a period of service outage or expected service outage, the process moves from step 308 to step 309 to determine if it is a high priority call, such as a call of an urgent nature. If so, the process moves to block 311 and implements a priority call handling procedure. For example, where an emergency call is attempted by the vehicle operator (such as by pressing an emergency button in the vehicle), or where the telematics unit attempts to automatically place a call as the result of one or more vehicle airbags being deployed, the call can be determined to be a priority call and the priority call handling procedure may, for example, attempt to contact the call center once and, if unavailable, place the call to 911 or other PSAP. Alternatively, it could immediately place the call to a PSAP without trying the call center first. For other priority calls of a less urgent nature, the priority handling procedure can be, for example, to place the call to a backup, on-line call center or third party service, or could be to implement an aggressive retry strategy back to the call center 20, as indicated by the broken line in FIG. 3, so that the call goes through as soon as the call center becomes available. Furthermore, any occupant-initiated call can be considered a priority call and processed using the handling procedure of step 311. This might include placing the call to the backup call center or third party service mentioned above.

Where occupant-initiated calls are not treated as priority calls, or where the priority call handling steps of blocks 309 and 311 are not used, then occupant-initiated calls attempted during a period of call center service outage can be detected at step 313, in which case the vehicle, knowing that the call is being attempted during a time of service outage or anticipated service outage, can present the occupant with a message to that effect. This is shown at step 315. The message can be relative generic, simply informing the occupant that the call center is not available, or can also indicate the expected time that it will become available, or can include outage-specific information that was supplied to the vehicle back at step 304 when the vehicle was notified of the outage. The message can be presented to the occupant in any suitable fashion, such as an audio message played in the vehicle over the audio system 36 speaker. This approach can be used to provide the occupant with an instant response, rather than requiring the occupant to wait while one or more communication attempts are made in vain.

Once the telematics unit 30 determines that the call center service outage no longer exists (i.e., once steps 210/310 are complete), the telematics unit 30 can use various schemes to orderly instruct telematics units 30 to resume contacting call centers 20. A large number of vehicles 12 attempting to contact the call center 20 immediately after the period of call center service outage has passed could cause an undesirable deluge or spike in wireless traffic and call center 20 loads. As an illustrative example, assume some or all of a large fleet of vehicles are triggered to contact a particular call center 20 sometime during the hours of 4-5 AM on a specific Tuesday, and those vehicles 12 had been notified that the particular call center 20 was experiencing a service outage during that time. At 5:01 AM Tuesday, there would be a large influx of calls to the particular call center 20 unless a scheme directed the vehicles 12 to stagger or otherwise temporally space their calls from one another.

Figure 4:
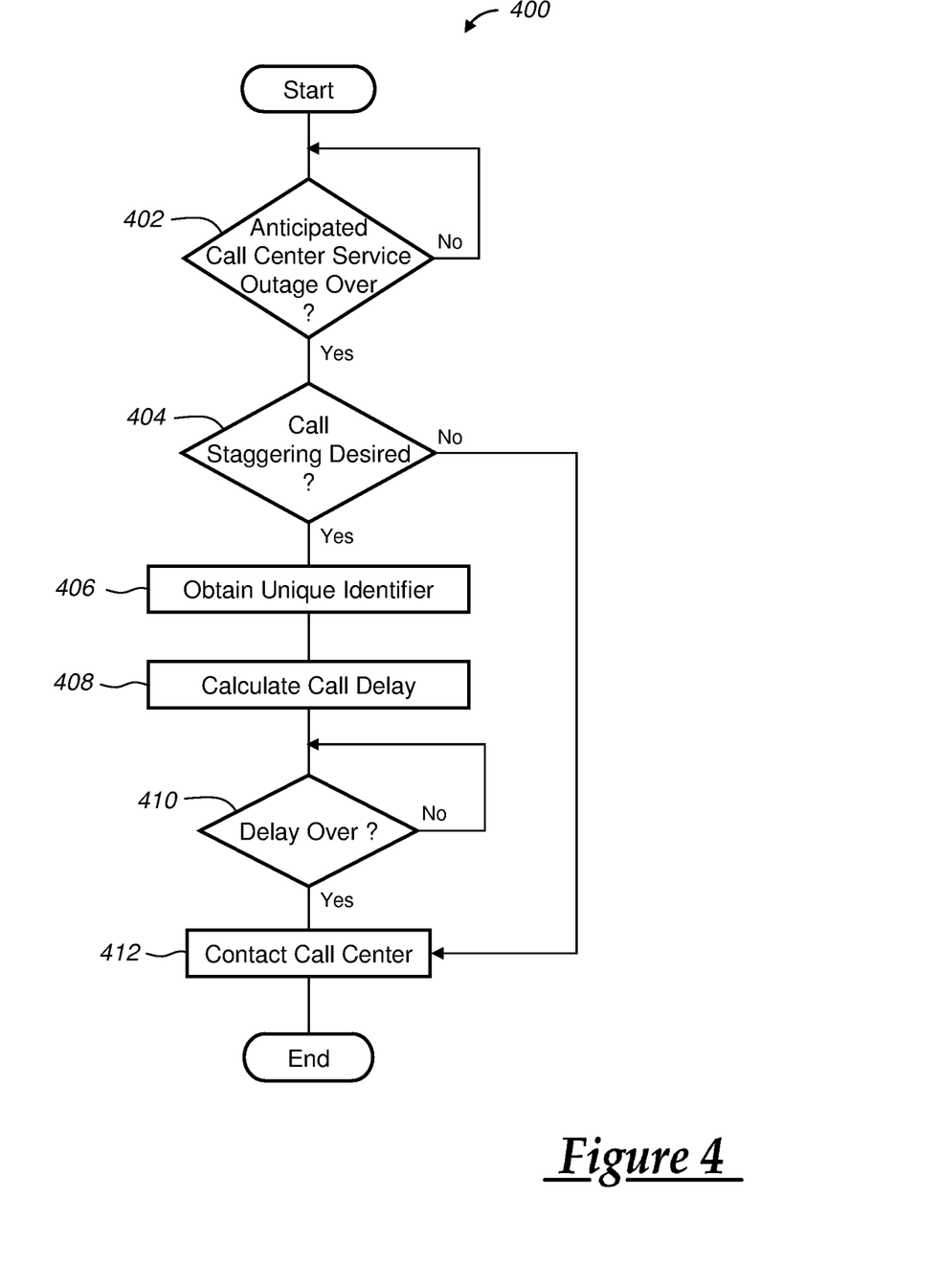
FIG. 4 is a flow chart of a process for implementing staggered calling of the call center following a period of service outage or unavailability.

FIG. 4 depicts one example of staggering vehicle contact times in a succession of stages. The method 400 uses unique vehicle or telematics unit identifiers to group the vehicles for this purpose. Again, this process can be implemented once the desired call of FIG. 2 or 3 have been postponed and the call center is again available. Thus, at step 402, once the call center outage is over, the process moves to step 404 where a determination is made as to whether call staggering is desired. Where, for example, the outage was brief or is not expected to involve a large amount of postponed calls, then call staggering can be ignored and the various vehicles can be allowed to immediately place their calls at step 412. However, where call staggering is desired, the process moves to block 306. The determination of whether to stagger calls can be made at the vehicle based on information such as the length of the outage, or can be determined remotely such as by the call center 20 and communicated to the vehicle at steps 204/304 when the vehicle was initially informed of the service outage.

At step 406, a unique identifier is obtained, such as the vehicle identification number (VIN), an electronic serial number (ESN), or telematics unit 30 station identification number (STID). This identifier can be used to put the vehicles into a number of groups, each of which has a separate call back time. The number of vehicles in each group can be selected as desired and can be as little as one vehicle per group, such that each vehicle would have its own unique callback time. As one example, where an STID consists of a seven-digit number, a single digit (0-9) can be generated for each telematics unit 30 using modular arithmetic, either at the call center 20 or the vehicle 12. The single digit can then be associated with a particular group of vehicles 12 where the staggered call center call back occurs according to group. Each group can have an instruction associated with it to wait for an additional units of time after the call center service outage has passed, and this occurs at step 308 where the call delay is calculated so that the vehicle knows how long to wait until it can place its call to the call center. The unit of time can be any desired block of time, such as one minute or ten minutes. Each group allows one or more of these units of time to pass before that vehicle 12 can contact the call center 20. For instance, every vehicle 12 assigned to group number 2 can be directed to wait two minutes after the call center service outage to contact the call center 20, while vehicles 12 assigned to group number 3 can be directed to wait four minutes. Alternatively, a scheme could be used where the unit of time could be multiplied by the group number assigned to the telematics unit. In this case, assume the unit of time is two minutes. Telematics units 30 assigned to group number 2 can multiply the group number 2 by the unit of time and determine that telematics units 30 within group 2 should wait four minutes before contacting the call center 20. Similarly, telematics units 30 assigned number 4 would wait eight minutes before contacting the call center 20. Additionally, the length of delay associated with particular groups can be rotated so that the average amount of time each telematics unit 30 waits is relatively constant over the entire group of vehicles. Once the delay is calculated, the process waits at step 410 until the delay is over, after which it contacts the call center, at step 412. The process then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of handling calls from telematics-equipped vehicles during call center outages, comprising the steps of:
   (a) receiving at a vehicle telematics unit a notification that originates from a call center and that notifies the telematics unit of one or more upcoming outages occurring at a call center;
   (b) detecting that a call from the vehicle to the call center is desired during an upcoming call center service outage; and
   (c) carrying out a call handling procedure for the desired call at the vehicle.

2. The method of claim 1, further comprising the steps of: sending the notification from a call center to a plurality of telematics-equipped vehicles; and storing the notification at the vehicle for subsequent use during step (b).

3. The method of claim 1, wherein the call handling procedure causes the desired call to be postponed to a later time.

4. The method of claim 1, wherein the call handling procedure processes the desired call based on whether the call was initiated automatically by the vehicle or manually by an occupant of the vehicle.

5. The method of claim 1, further comprising the step of determining a priority for the desired call, wherein the call handling procedure processes the desired call based on the priority.

6. The method of claim 1, wherein the notification of call center service outages is selected from the list consisting of: a time period, a beginning time and end time, a notice that the call center will be unavailable until further notice, or a notice stating that the call center is now operational.

7. The method of claim 1, wherein the notification of the call center service outage is sent via a satellite radio broadcast.

8. The method of claim 1, wherein step (b) further comprises determining the time at which the telematics unit intends to contact the call center and comparing that time with periods of call center service outages.

9. The method of claim 1, wherein step (c) further comprises directing a group of telematics-equipped vehicles to contact the call center in a staggered succession of stages.

10. The method of claim 1, wherein the notification is received from the call center.

11. A method of handling data transmissions from telematics-equipped vehicles during periods of call center unavailability, comprising the steps of:
    (a) identifying time periods during which a call center will be unavailable;
    (b) wirelessly conveying to a plurality of telematics-equipped vehicles the periods during which a call center will be unavailable; and
    (c) delaying communication attempts from the telematics-equipped vehicles to the call center based on the periods during which a call center will be unavailable by directing a group of telematics-equipped vehicles to contact the call center in a staggered succession of stages.

12. The method of claim 11, further comprising the step of checking whether a telematics equipped vehicle anticipates contacting the call center during at least one period of anticipated call center service unavailability.

13. The method of claim 11, wherein a telematics-equipped vehicle identifies the time periods during which the call center will be unavailable.

14. The method of claim 11, wherein the time periods during which call center will be unavailable are determined at the call center.

15. The method of claim 11, wherein the periods during which a call center will be unavailable are selected from the list consisting of: a beginning time and end time, a notice that the call center will be unavailable until further notice, or a notice stating that the call center is now operational.

16. The method of claim 11, wherein step (b) occurs using a satellite radio broadcast.

17. The method of claim 11, further comprising the step of storing periods during which a call center will be unavailable at a telematics-equipped vehicle.

18. The method of claim 11, further comprising determining the time at which a telematics equipped vehicle intends to contact the call center and comparing that time with periods of call center unavailability.

19. A method of handling data transmissions from telematics-equipped vehicles during call center outages, comprising the steps of:
    (a) establishing at least one period of anticipated service outage occurring at a call center;
    (b) notifying a plurality of telematics units of the at least one period of anticipated service outage occurring at the call center;
    (c) storing at the plurality of telematics units the at least one period of service outage occurring at the call center;
    (d) checking whether a desired communication to a call center occurs during the at least one period of anticipated call center service outage; and
    (e) postponing contacting the call center if the desired communication is during the at least one period of anticipated service outage occurring at the call center.

* * * * *